(12) United States Patent
LeFebvre et al.

(10) Patent No.: US 7,688,218 B2
(45) Date of Patent: Mar. 30, 2010

(54) RAILROAD TRAIN MONITORING SYSTEM

(75) Inventors: William LeFebvre, West Chester, PA (US); Michael J. McCann, Wilmington, DE (US)

(73) Assignee: Amsted Rail Company, Inc., Granite City, IL (US)

(*) Notice: Subject to any disclaimer, the term of this patent is extended or adjusted under 35 U.S.C. 154(b) by 388 days.

(21) Appl. No.: 11/615,309

(22) Filed: Dec. 22, 2006

(65) Prior Publication Data

US 2007/0152107 A1 Jul. 5, 2007

Related U.S. Application Data

(60) Provisional application No. 60/753,593, filed on Dec. 23, 2005.

(51) Int. Cl.
*G08B 21/00* (2006.01)
(52) U.S. Cl. .................. 340/682; 340/438; 384/459; 246/169 R
(58) Field of Classification Search ............ 340/682, 340/870.17, 870.26, 870.3, 631, 632, 438, 340/902–905; 73/53.05; 384/459, 446, 448, 384/456, 626; 246/169 R, 122 R, 292, 473 R
See application file for complete search history.

(56) References Cited

U.S. PATENT DOCUMENTS

| | | | |
|---|---|---|---|
| 3,718,040 A | 2/1973 | Freeman et al. ............... 73/146 |
| 4,812,826 A | 3/1989 | Kaufman et al. ........... 340/682 |
| 5,140,849 A | 8/1992 | Fujita et al. .................... 73/593 |
| 5,347,871 A | 9/1994 | D'Andrea et al. ............. 73/775 |
| 5,372,435 A | 12/1994 | Genero et al. ............... 384/448 |
| 5,381,090 A | 1/1995 | Adler et al. .................. 324/174 |
| 5,381,692 A | 1/1995 | Winslow et al. ............... 73/593 |
| 5,440,184 A | 8/1995 | Samy et al. .................... 310/90 |
| 5,446,451 A | 8/1995 | Grosskopf, Jr. ............. 340/682 |
| 5,503,030 A * | 4/1996 | Bankestrom ........... 73/862.627 |
| 5,642,944 A | 7/1997 | Dublin et al. ............... 384/102 |
| 5,682,139 A | 10/1997 | Pradeep et al. ............. 340/539 |
| 5,810,485 A * | 9/1998 | Dublin et al. ............... 384/626 |
| 6,127,672 A | 10/2000 | Danisch ................. 250/227.14 |
| 6,161,962 A | 12/2000 | French et al. ............... 384/459 |
| 6,179,471 B1 | 1/2001 | Moretti et al. .............. 384/448 |
| 6,263,265 B1 | 7/2001 | Fera ............................ 701/19 |
| 6,301,531 B1 | 10/2001 | Pierro et al. .................. 701/29 |
| 6,324,899 B1 * | 12/2001 | Discenzo ................... 73/53.05 |
| 6,441,324 B1 | 8/2002 | Stimpson .................... 177/137 |
| 6,535,135 B1 | 3/2003 | French et al. ............... 340/682 |
| 6,668,216 B2 | 12/2003 | Mays .......................... 701/19 |
| 6,695,483 B2 | 2/2004 | Sakatani et al. ............. 384/448 |

(Continued)

FOREIGN PATENT DOCUMENTS

GB 2 295 207 5/1996

(Continued)

*Primary Examiner*—Anh V La
(74) *Attorney, Agent, or Firm*—Fox Rothschild, LLP

(57) ABSTRACT

Railcar monitoring utilizes instrumented, flexible pads supported within the truck pedestal jaws on the bearing adapters. The pads contain sensors for monitoring temperature pressure, shifting loads, truck hunting and the like and have circuitry for processing information received from the sensors and for processing and reporting departures of performance variables to a remote source. The system cyclically activates polling each pad on a car and communicates signals of critical departures and car identity to a remote source.

33 Claims, 3 Drawing Sheets

U.S. PATENT DOCUMENTS

| | | | |
|---|---|---|---|
| 6,882,851 B2 | 4/2005 | Sugar et al. | 455/454 |
| 6,945,098 B2 | 9/2005 | Olson | 73/86 |
| 6,948,856 B2 | 9/2005 | Takizawa et al. | 384/448 |
| 7,014,368 B2 | 3/2006 | Morita et al. | 384/448 |
| 7,018,106 B2 | 3/2006 | Okada | 384/448 |
| 7,034,660 B2 | 4/2006 | Watters et al. | 340/10.41 |
| 2003/0146821 A1 | 8/2003 | Brandt | 340/10.1 |
| 2004/0251058 A1 | 12/2004 | Carr et al. | 177/136 |
| 2005/0028596 A1 | 2/2005 | Gall | 73/715 |
| 2005/0194497 A1 | 9/2005 | Matzan | 246/169 A |
| 2005/0268813 A1 | 12/2005 | Van Auken | 105/218.1 |
| 2006/0042734 A1 | 3/2006 | Turner et al. | 152/154.2 |
| 2006/0080048 A1 | 4/2006 | Kessler et al | 702/35 |
| 2006/0154398 A1 | 7/2006 | Qing et al. | 438/48 |
| 2006/0207336 A1 | 9/2006 | Miyazaki | 73/760 |
| 2007/0018083 A1 | 1/2007 | Kumar et al. | 250/227.14 |
| 2007/0095160 A1 | 5/2007 | Georgeson et al. | 73/866 |
| 2007/0186642 A1 | 8/2007 | Sano et al. | 73/172 |
| 2007/0208841 A1 | 9/2007 | Barone et al. | 709/223 |
| 2007/0255509 A1 | 11/2007 | LeFebvre et al. | 702/33 |
| 2008/0064941 A1 | 3/2008 | Funderburk et al. | 600/347 |

FOREIGN PATENT DOCUMENTS

| | | |
|---|---|---|
| JP | 63236937 A | 10/1988 |
| WO | WO01/15001 | 3/2001 |

* cited by examiner

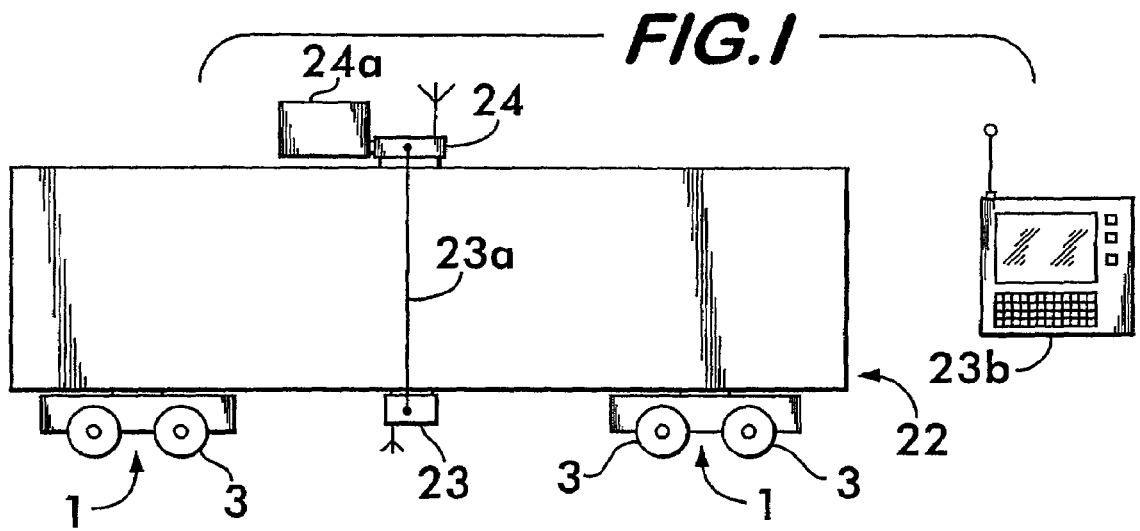
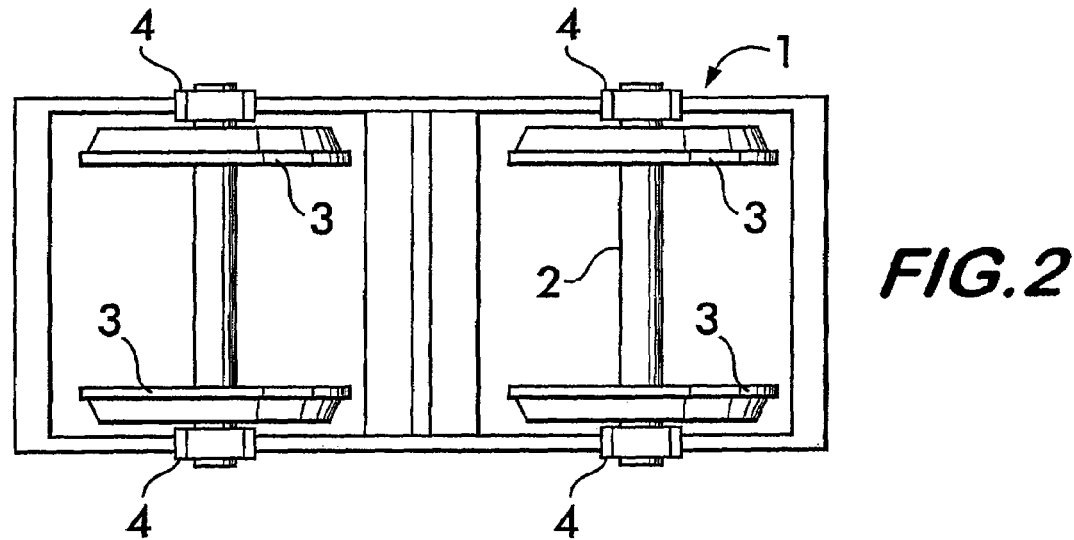
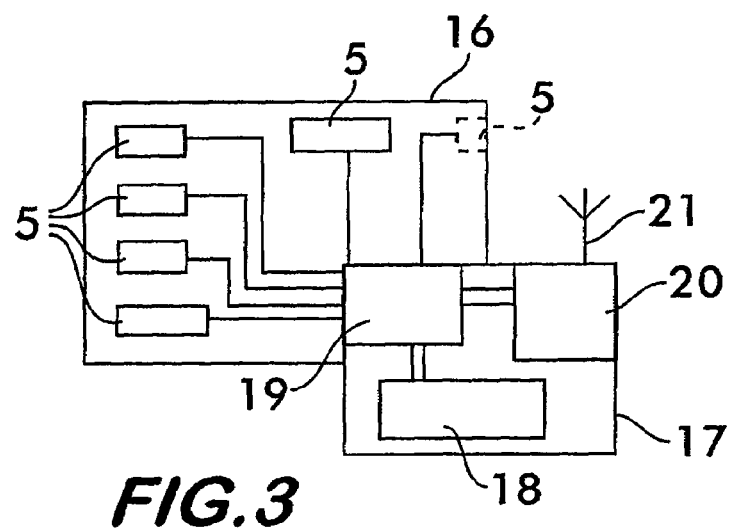

RAILROAD TRAIN MONITORING SYSTEM

FIELD OF THE INVENTION

This invention relates to a monitoring system for railroad trains and the like, and more particularly a system that uses an instrumented roller bearing adapter pad to detect the occurrence and cause of poor performance at wheel set, truck, freight car or train level.

BACKGROUND OF THE INVENTION

More than ever, railcar owners and operators need a better understanding of how their assets are performing. With heavier cars in service, there is a greater need to identify "bad actors" (cars which can damage track infrastructure and lead to derailments) as soon as their performance becomes unacceptable. There is also a need to increase average train speed by improving high speed performance and reducing unplanned service interruptions through mechanical failures. Car owners increasingly seek to implement preventative maintenance programs to avoid mechanical failures and schedule repairs at a facility and time of their choice. Finally, with more automation of rail operations and increasing regulation to improve safety, the railroad industry needs new ways to monitor the performance of trains, cars and railcar trucks.

Some of the performance criteria that need to be monitored include roller bearing condition and temperature, roller bearing adapter displacement, wheel condition, truck hunting/warp/binding, brake status and performance, whether a partial derailment has occurred and potentially problematic track condition. Since some of these performance problems could lead very quickly to a catastrophic failure of the train, it is desirable to monitor and report exceptions to the locomotive or to a central data handling facility as quickly as possible. Further, given the demanding environment in which railroad trains operate, any system must be rugged, reliable and able to operate for long periods with little or no maintenance. In addition, to be cost effective, it should not add significant cost to install and maintain the system. Since there are more than 1.5 million freight cars in North America alone, and a system of monitoring all cars in use is highly desirable, any such system need to be able to deal with a very large address a very large number of potential devices.

One approach widely adopted in North America is to use wayside defect detectors at fixed locations throughout the railroad network. Detectors measuring bearing temperature (hotbox detectors) are common, while other wayside detectors to measure wheel impacts, bearing condition (from acoustical signatures) and lateral forces are gradually being introduced. However, while one detector can monitor many freight cars as they pass, they can only provide a spot check on performance. It is quite possible that defects will only become apparent and escalate to a critical level between detectors. A system which is continuously monitoring railcar performance is needed.

Another approach to railcar performance monitoring has been to use on-board instrumentation. One such prominent system has been developed for the Federal Railroad Administration. In this and other similar systems, a number of instruments on different areas of a freight car are used to make discrete measurements before being communicated to a central hub on the freight car. While providing a superior solution to that provided by wayside monitors, wiring, complexity and costs increase the investment required to monitor the cars.

SUMMARY AND OBJECTS OF THE INVENTION

This invention has the objective of providing means for continuously, while in service, monitoring the behavior and condition of the trucks, wheels and bearings of a railroad car and provide both regular assurance of proper performance and, as necessary, warning of impending or actual failure in a timely and useful manner to the operators and owners of the train whereof if forms a part.

It is a further objective of this invention that the performance of the railcar and its components could be combined with operating data from the locomotive to provide a complete train monitoring system.

It is a further objective of this invention to provide such functionality with minimal recourse to making wired electrical connections either between components mounted on the trucks of the railcar or between components mounted on the trucks and components mounted on other parts of the car and other parts of the train, including the locomotive.

It is a further objective of this invention that the components can be inserted or removed for inspection and repair or replaced during normal maintenance work on the railcars.

It is a further objective of this invention to provide means for the timely analysis of measurements made during operation of the train so that the information about performance or failure can be sent in a concise manner so that there is no need for detailed measurements to be transmitted.

It is a further objective of this invention that the messages sent about performance or failure contain sufficient information that the exact location on the train of the item or items in question can be unequivocally determined, and that the location of the train, or indeed of the freight car can be reported, should that information be available.

It is a further objective of the invention that when operating wirelessly, it can be expanded to exploit the available choices of operating frequencies (channels) to give relief from interference between the successive (adjacent) cars in a train or from other equipment operating in the same band of frequencies.

While the discussion which follows describes the vehicle as a freight car, it will be understood that the same methods are applicable to any railroad or, in some instances, other multi-axle vehicles. Furthermore, while the description which follows features a freight car with two trucks (or bogies), it is applicable to almost any configuration with more or less trucks or axles.

BRIEF DESCRIPTION OF THE DRAWINGS

FIGS. 1-3 are schematic views showing the arrangement of components suited for use in carrying out the objectives of the present invention;

DETAILED DESCRIPTION OF THE EMBODIMENTS

Figure 4:
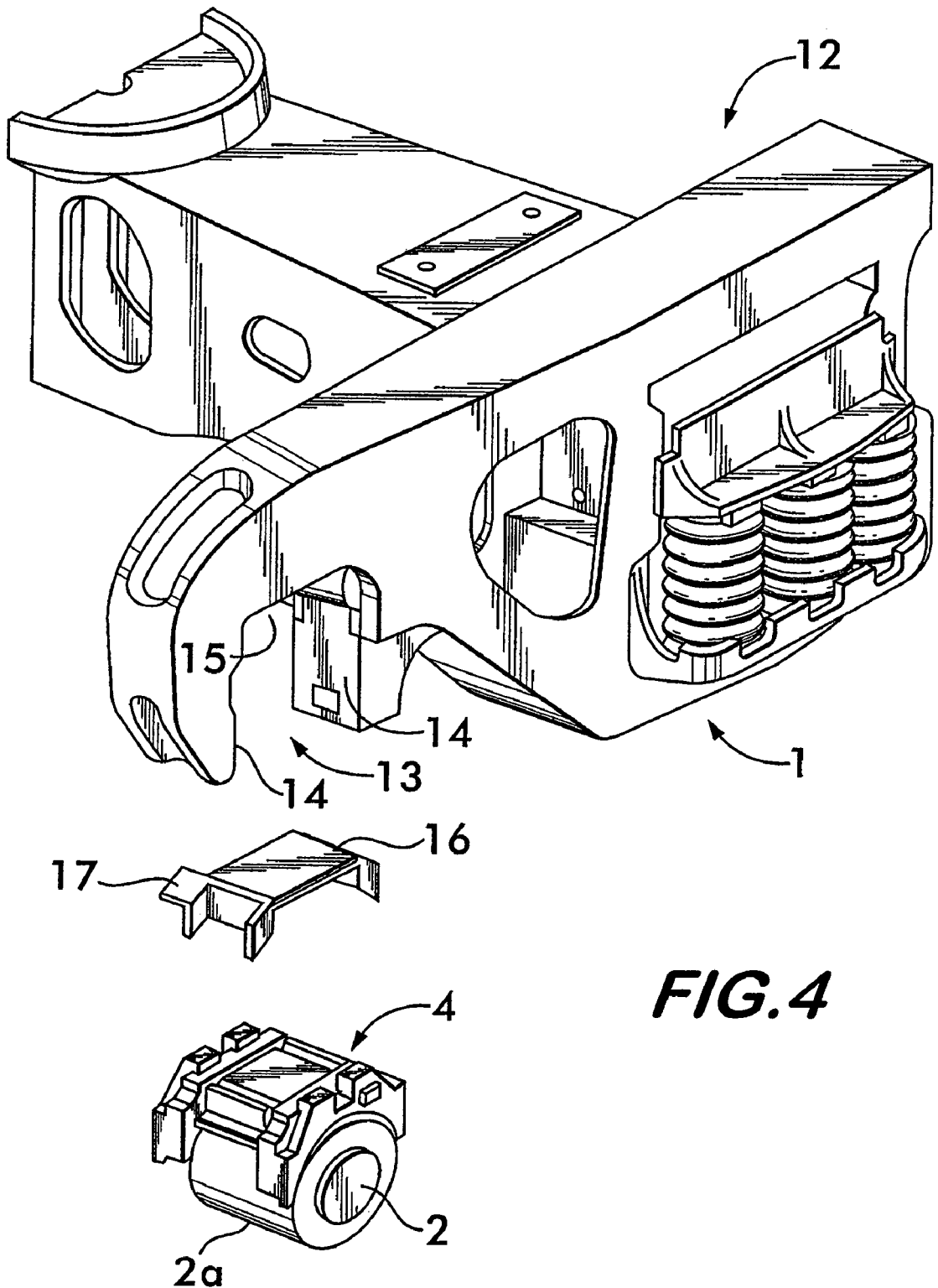
FIG. 4 is an exploded perspective view of portions of a railcar truck illustrating the position of an instrumented pad of the invention with respect to the railcar truck.

Turning now to FIGS. 1, 2 and 4, trucks 1, shown diagrammatically, each carry two axles 2 each with two wheels 3. The axle bearings 2a and bearing adapters 4, best shown in FIG. 4, are configured so that each bearing transmits the load which it carries and heat that it may generate through pads 16 and to the truck.

FIG. 4 illustrates a portion of a railcar truck 1 showing the relationship of an instrumented pad 16 relative to other truck parts. In FIG. 4, one end of a truck side frame 12 is shown. Each side frame has a pair of downwardly extending pedestal jaws 13. Parallel side walls 14 of each pedestal jaw along with a roof section 15 combine to form a pedestal jaw opening.

The truck also includes bearing adapters 4, one of which is shown in FIG. 4. The adapters have a generally rectangular upper surface with depending legs extending from the corners of the top structure. The legs have facing curved side surfaces which are configured so as to rest on the outer surface of a bearing 2a mounted on the end of wheel bearing axle 2. The adapter is typically comprised of cast steel. Adapter pad 16 is generally rectangular in plan view and has depending legs. The adapter pad 16 is preferably comprised of a cast or injected molded elastomeric polymer. The adapter pad 16 is formed to seat upon the upper surface of adapter 4 which, as indicated above, seats in turn on the bearing. The adapter and details of the pad as they relate to its function as a load bearing and attenuation means are more particularly described in U.S. Published Application No. 2005/0268813, dated Dec. 8, 2005.

Referring further to FIG. 2, the pads 4 are seated on the upper rectangular surface of the bearing adapter. Each bearing transmits the loads which it carries and heat that it may generate through the adapter to the pad it carries and, thus, to the railcar truck.

FIG. 3 shows, in schematic form, an adapter pad 16 modified to carry out the objectives of the present invention. The pad contains a plurality of sensors 5 which are preferably embedded into its upper, side and lower surfaces or into other locations such as its end surfaces as may be necessary for the purposes of the invention as explained more fully below. In preferred form, the pad 16 has an extended attachment portion 17 located so as to be relatively isolated from the forces transmitted through the adapter 16. The extended portion 17 contains a power source 18, an analog/signal conditioning means and analog to digital conversion means and an associated microprocessor unit 19 and a communications unit 20 which is preferably a low power radio transmitter/receiver having an antenna 21. The sensors are electrically connected to the analog to digital conversion circuit unit and the microprocessor unit which, in turn, is connected to and controls the communications unit by means of which messages can be sent and received. Various means of supplying power to the pad may be employed. The source of power may be a battery delivering sufficient voltage and having sufficient energy storage capacity so that when turned on periodically and briefly, as described hereinafter, the pad can be functional for several years, consistent with the normal service life of the bearing components used in the trucks.

Alternatively, the power source may consist of an energy scavenging device which supplies energy to a rechargeable battery or capacitor. A strain generated electrical power source may be employed. Although the energy source may be a source mounted on the car body, it is preferred that it be on the truck and most preferably on the extension to the pad so as to avoid the need for electric wiring between relatively movable car parts.

FIGS. 1-3 further illustrate a railroad freight car 22 having trucks 1 with pads 16 with their associated sensors and control and communication circuit units 19 and 20. In the example described, each truck carries four pads 16 (one for each bearing) each having a power source 18, control circuit unit 19 and a communications unit 20, preferably comprising a radio transmitter/receiver.

Mounted on the railcar body, preferably at a point at about midway between the two railcar trucks is a data control unit 23 also having a radio/receiver which has the ability to communicate with the radios on the pads 4 on its own railcar together with a microprocessor whose functions will be described hereinafter. The data control unit 23 is linked by cable 23a to a communications device 24 shown herein as being on top of the railcar, although other positions may be appropriate, depending on factors such as the type of car to which the invention is applied. Under some circumstances and for some car types, the data control unit and the communications device may be contiguous.

The communications device 24 is advantageously powered by a solar cell represented by reference character 24a or other electrical means having the capability of maintaining continuous functionality. Communications device 24 serves to link the railcar either directly to the locomotive drawing the train so that the engineer or other crew personnel have immediate notice of problem cars. Optionally, communication may be via track side automatic equipment identification means or to a cellular or satellite radio system or other communication equipment to monitoring stations as desired by the user. In the event that wired communication from the locomotive is available throughout the train as, for example, if electronic braking becomes standard, then the communications device may be connected to this communication line. The power supply for the communications device 24 may also provide power for the data control unit 23a, in which case the electrical connection 23 may be a multi-connector link.

Also shown in FIG. 1 is a hand-held unit 23b containing a microprocessor and the radio for communication with the instrumented pad 16 by its radio and also with the data control unit 23. Unit 23b, hereinafter called a "registrar", is designed with very limited signal transmission capability so that it must be placed physically close to the pads 16 or the data communications unit 23 for communication to take place. This insures that the operator will communicate with only one such device without similar devices on other cars on the same or a nearby train receiving the radio transmissions.

Although the use of a radio for making the communication by the registrar is preferred, direct electrical contact could be employed. However, because of the harsh environmental conditions to which railcars are exposed, direct electrical contact would be liable to reduce reliability and would be more time consuming to carry out, especially when communication with a large number of cars is necessary. The use of the registrar in carrying out the functions of the invention will be described further below.

At this point, it should be noted that a feature of the invention is to facilitate ascertaining the address for radio communication at the time of installation of a pad or during replacement of a pad or a data control unit. For this purpose, as an alternative to radio communication, a radio frequency identification (RFID) tag or a corresponding bar code or other readable version of the extended address which can be read out and recorded by the registrar could be employed.

While the antennae shown in FIGS. 1 and 3 are schematically illustrated as of wire or rod form. In practice, they may be micro-strips or conformal arrays and may be, for example, metallic conductors on a ceramic substrate.

Likewise, in place of battery power for the instrumented pads an onboard electrical supply may be available in the railcar and could be employed if available. Alternative energy scavenging devices which derive energy from the rotation of the wheels could be used to generate electrical power. As a practical matter in choosing a source of power, high priority should be given to a power supply most likely to function for several years without the need for battery replacement or the need to perform other maintenance work.

As noted above, it is a feature of the invention that the radios within the pads 16 and the data control units 23 need only communicate over a very short range. For this purpose, radios conforming to the IEEE802.15.4 standard for wireless sensor networks are preferable. This is the short range standard of which the ZigBee sensor network systems is exemplary. The power levels are low and range is limited but all that is required is generally the ability to communicate between the pads on the trucks of a particular car and the data control units of that car or with a registrar held by a workman standing close by the car. The existence of standards for the data formats and open source software for using these systems with capable micro-controllers makes this a preferable option. An especially compelling advantage to radio transmission is that wiring on the trucks and wiring from trucks to railcar is undesirable as being susceptible to breakage, and wiring along the length of a freight train very unlikely to be acceptable unless industry wide adoption of electronic brakes or the like is universally adopted.

Means for wireless communication based on the IEEE standard are available and adaptable to allow the instrumented pads and data control units to establish a network of connections without external intervention. They can be set up to recognize the relationship of truck and axle location on a railcar or set up so that the digital communication unit is informed of the configuration providing thereby a multi-hop means of linking the network together. Radios used in carrying out the above aspects of the invention are intended to be operated intermittently at low power. Several frequency bands are acceptable in various parts of the world. A suitable available frequency at which the radios will be operating in North America is about 2.4 GHz. Although it is preferably expected that the format and coding of messages will conform to the aforementioned IEEE standard, other arrangements are feasible.

In an exemplary system, the instrumented pads 4 contain several sensors for measurement of dynamic and static vertical loads and shear or lateral forces imposed by the railcar truck and hence by the freight car by the bearing adapters. Conversely, these are the forces which the axles, themselves attached rigidly to the wheels, and subject to track irregularities, are applying to the truck. The exemplary instrumented pads 16 also carry temperature sensors to give an indication of the temperature of the associated bearing, since it is important for safety that a bearing does not become overheated.

With reference again to FIGS. 1-3, in operation, the microprocessor on an instrumented pad 16 is normally in a passive, low power state, but is programmed to switch on briefly, periodically. It gathers readings from each of the sensors and performs preliminary analysis of the readings. The rational for the choice of sampling frequencies and the selection of sensors to be read is based on the type of behavior being monitored and the particular application. Sampling should be at a frequency several times the highest frequency to be detected from the data. More frequent sampling will gain no further intelligence but increase power consumption.

The periodicities of sampling and of reporting are controlled by the data control unit 23. Nevertheless, should the pads detect indications of fault or impending failure, the microprocessor on the pad may be programmed to switch on the radio which it controls and send an appropriate message via the radio to the data control unit 23. An example of such an event could be a sudden increase in temperature. A large voltage spike generated by the power scavenging device may also be used to activate the pads microprocessor if it were then in a low power state. In the absence of such a problem, the pad microprocessor follows its given schedule which would normally result in its being in a low powered state most of the time.

The data control unit 23 is intended to serve several purposes. It coordinates the timing of the cyclic testing performed by the instrumented pad microprocessor and the timing of the messages issuing therefrom. As an aggregator of information, it is programmed to compare information from all of the trucks on the railcar and draws inferences from them as to the status of the car, for example, the data control unit uses inference engine techniques to identify unsatisfactory behavior such as swaying, bouncing or even partial derailment. It passes on information from the communications device 24. For example, the communications device 24 may include a means of measurement such as a global positioning system to provide information about vehicle speed which is useful in checking truck behavior such as hunting. This information may also be used to inhibit sensor checks when no purpose is thereby to be served in order to preserve energy usage.

Likewise, if desired, detectors of factors such as ambient temperature and humidity (rain, snow and icing) can be built into the communication device 24 or the data control unit 23 in the distributed inference engine functions for use described below. Additionally, the data control units 23 or the communications device 24 may contain a triaxial accelerometer or rate gyro for triggering certain analysis modes or verifying readings made by the pad and providing information on a variety of car body motions.

As a conduit, the data control unit 23 passes messages on to the communications device 24 for onward transmission to the locomotive or to other remote receivers and receives, in turn, for the purpose of its own analysis and distribution to the pads, when appropriate, information or instruction as, for example, from the locomotive or from other remote sources.

Figure 5:
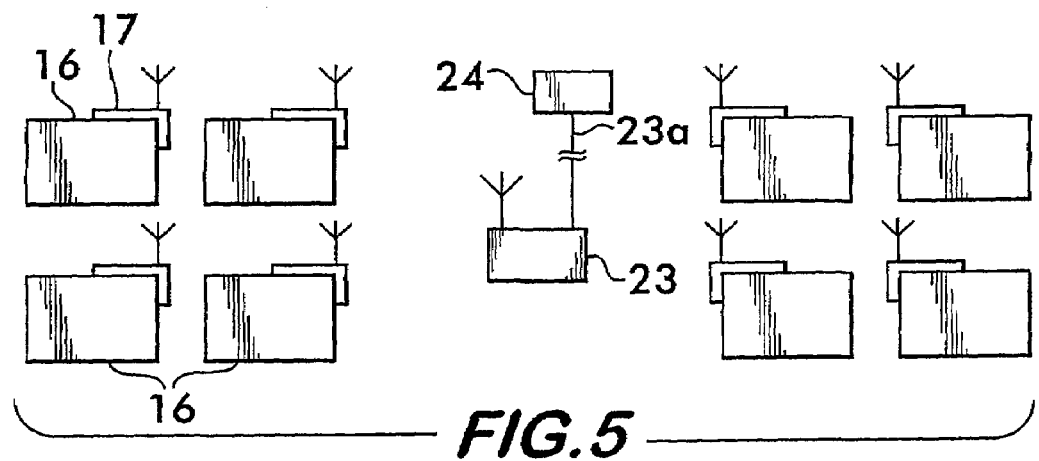
FIGS. 5-7 are schematic views illustrating alternative configurations of elements of the invention.
Figure 6:
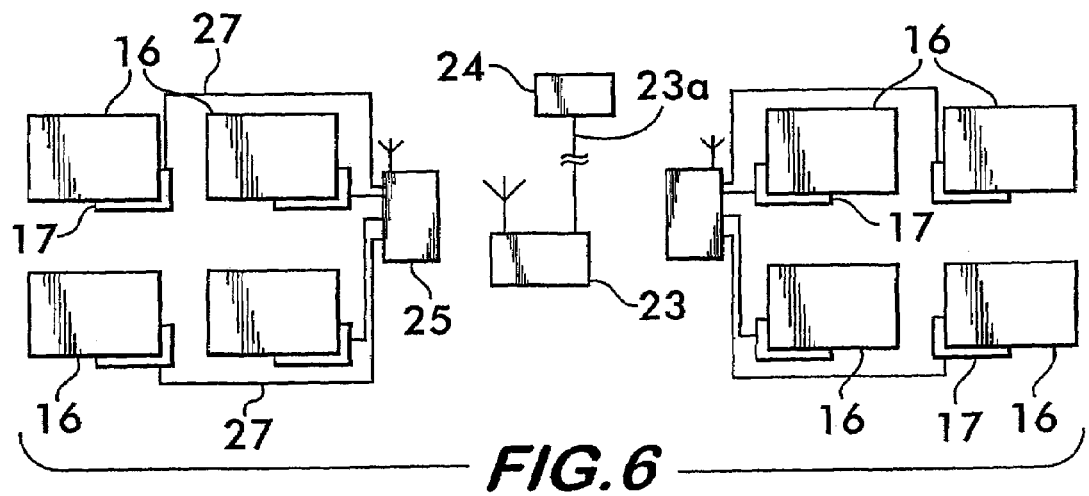
Figure 7:
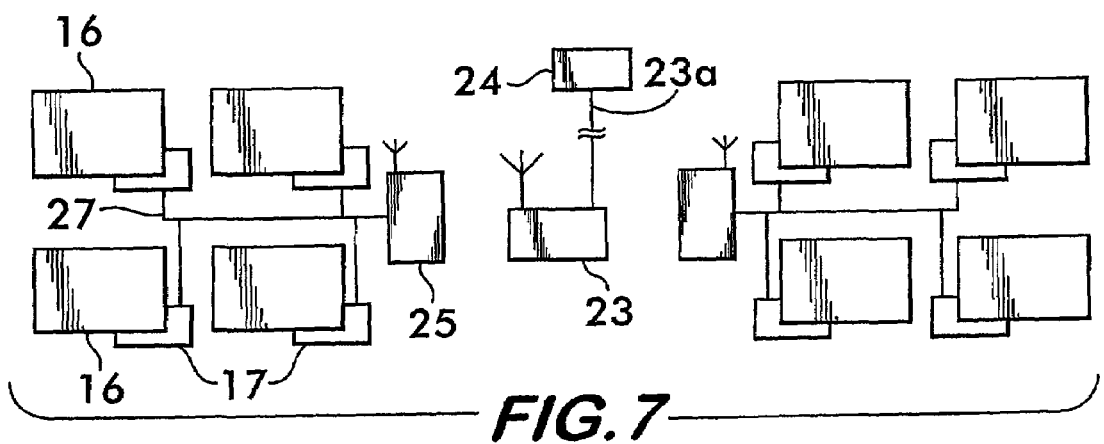

Alternative configurations for the monitoring system described in FIGS. 1-3 are illustrated in FIGS. 5-7. In the embodiment shown in FIG. 5, each instrumented pad 16 has its own microprocessor and radio. This arrangement is intended to use a protocol for networking which allows the messages to be passed between pads on their way to and from the digital communications unit 23.

In the embodiment of FIG. 6, all of the pads 16 from one truck communicate with a single microprocessor and radio unit 24 passing along multi-core cables 27. This minimizes the number of electronic components at the cost of making a large number of wire connections on the truck. The computational services performed in the microprocessor unit on the truck may be somewhat different from those in the microprocessor unit of FIG. 5. In this embodiment, all the analog to digital conversion functions are performed in the microprocessor and any inference functions performed there make assessments for all sensors for all pads on the truck.

A further alternative embodiment is shown in FIG. 7. In FIG. 7, each instrumented pad 16 has its own analog to digital conversion unit which may be incorporated into a microprocessor 28 on the particular pad. Those microprocessors can then communicate with the single data handling unit 25 on the truck and hence to the data control unit 23. As in the configuration of FIG. 6, any inferences or data analysis performed at unit 25 takes account of information from all the sensors on all the pads on the truck.

Other options include standard CANBus communication schemes where wired links are used. In addition, CANBus or other standards may be implemented in the event of wide scale implementation of electronically controlled pneumatic brakes potentially providing other options for communication schemes.

Communications along the train may be provided in a variety of ways. The WiFi (IEEE802.15.11 standard) may be appropriate for very long freight trains. For communication along passenger trains, Rail Transit Vehicle Interface Standard, IEEE1473-199 would be applicable.

Furthermore, it should be noted that, in principle, it would be feasible to let the instrumented pads communicate along the train, passing messages from one freight car to the next. However, for long trains, this causes a message to make many hops which is essentially less reliable than a single, more powerful link from each car to the locomotive or other remote location. Other problems include the likelihood that trains will be reconfigured with freight cars possibly being removed or shuffled or the train being pulled by a locomotive at its opposite end. Any such network depending upon pad-to-pad links from car-to-car would require reconfiguration of the train in marshalling yards.

As indicated above, it is a feature of the invention to have appropriate means of addressing and identifying each and every instrumented pad in railcars used in the system. Further, it is necessary that the instrumented pads on trucks on adjacent freight cars, be they on the same train or not, continue to function while within each other's radio range without mutual interference. It must be possible to form trains from any freight cars and to replace a single pad on a truck without having to replace all the other pads on the truck or the freight car. Even if there are no problems to report, it is important that the system provide assurance that it is still functioning properly. The preferred system described herein uses messages initiated by the instrumented pads for this purpose. The alternative of using polling by the data control units to check the status of the instrumented pads requires the pads to switch on and act as receivers at accurately controlled times and for periods which require longer operation at full power than if they are allowed to send messages based on their own timing with the requirement that the data control units is always in a receiving mode.

The instrumented pads which are to be mutually interoperable with the corresponding data control units must all use matching frequencies. The aforementioned IEEE802.15.4 standard designates frequencies or channels in each frequency band. For example, in the ISM band, at 2.4 GHz there are 26 channels. There is also a standard for the pattern of messages such that each form a packet of a multiplicity of 8-bit bytes of data wherein each byte has a preassigned meaning. Within this pattern, one byte is assigned for a group number and two bytes are assigned for an address within a group. Another byte is assigned for the type of message which might be interpreted as a command. The associated radio receivers and their controlling microprocessors are designed to ignore messages received from a source in a different group. They do not detect messages on other frequencies then their chosen operating frequencies. However, they can change operating channels (frequency) under program control. They can act appropriately on messages that belong to their own group. For use on railroads, a larger number of devices than can be covered by the two-byte address will be needed and, furthermore, means has to be provided so that a data control unit can recognize messages from instrumented pads on its own freight car. Instrumented pads have to be able to recognize messages from their own data control unit and both have to be able to tolerate potential interference from instrumented pads and data control units on other nearby freight-cars either in the same train or a passing train. They also have to be able to tolerate potential interference from other devices operating in the same unlicensed band.

The identification number or address may be programmed into the electronics module at manufacture.

The given address for an instrumented pad may additionally or alternatively be stored in an RFID (radio frequency identification) tag on or embedded into each pad 4. The physical placement of the pad on the truck results in it being near to the trackside. Specifically, it could be on the outer side of the side frame of the truck and, thus, near to any trackside monitoring equipment. That provides the opportunity for at least the recognition of passing devices by the fixed equipment and, if active RFID tag technology is used, to allow for an alternative communication route from car to central data repository or the owners.

The given address may conveniently be visible as a readable number optionally with a barcode for the convenience of users, though the demanding operational environment may make this alternative of limited use.

It will be apparent that any addressing scheme which provides sufficient individual addresses or identities may be used. The address of the pad may be made conforming to the extended Internet Protocol (IPv6) addressing scheme, using 6 bytes so that these devices can have their own IP addresses.

The preferred embodiment described below can be augmented to use multiple channels (radio frequencies) thereby providing a means of virtually eliminating interference between adjacent cars in a train.

The underlying purpose of the invention is to be able to monitor the behavior of all the trucks and bearings and wheels on a train. An alarm message must get through from any railcar to the locomotive or to the remote data handling service as quickly as possible, preferably within a few seconds.

However, the burden of transmitting all the data that might be sampled in performing such monitoring is extremely large and, for the most part, detailed data is not significant. Preferably, only the observations which imply some fault or misbehavior are recognized. To reduce the radio traffic to manageable proportions, the system is designed to process the raw sensor data, looking for signs of trouble and then send only essential indicative information. To this end, a distributed inference engine is used, sharing the essential functions between the microprocessors at the instrumented pads and at the data control unit 23. It is a purpose of this invention to reduce the radio traffic between pads and data control unit so part of the data analysis is done at the pads and only relevant information is transmitted to the data control unit from the pads for further analysis and recognition of faults.

In the example system illustrated above, the microprocessors 19 at the instrumented pads 16 take a series of measurements and treat them as a time series. The search algorithms, forming an inference engine, can identify, for example, periodicities and cross correlations in and between time series so that any behavior detectable at pad level will be seen. For instance, hunting of a truck back and forth across the line of the rails, is at a frequency determined by truck geometry and wheel rotation speed. Swaying and rocking of the car is at frequencies dominated by the mass spring systems of suspension and load. To various extents, depending on vehicle design, these irregularities in behavior will be apparent in the changing load and distribution of load in the instrumented pad, which can sense, for example, vertical and shear and braking forces. Wheel irregularities create repetitive patterns of forces at the rotation frequency which can be calculated from vehicle speed. Track defects can generate large and sudden forces in the wheels, bearings and truck and on to the car and its load.

If such behavior is inferred at the instrumented pad and the magnitude is sufficient to cause alarm, relevant attributes and timing (relative to the time of transmission of report) can be passed to the car's data control unit.

Given that more than one instrumented pad may report misbehavior, then the components of the inference engine in the data control unit take responsibility for making assessments for the whole truck and ultimately for the freight car. When serious trouble is inferred, then messages are sent via the communications link 23a, 24 to the locomotive, etc.

Examples of performance that the system is capable of monitoring include:

Bearing temperature—A temperature sensor in instrumented pad 16 monitors relative changes in temperature against other bearings and provides an alarm threshold or long term trends to link to bearing condition. The well-being of a roller bearing can be inferred using either trends or alarm levels, avoiding a potential bearing burn off and possible derailment and providing a direct measurement that can be used to avoid false alarms from wayside hotbox detectors. As a further purpose of this invention, the observations from wayside detectors for temperature and other effects can be compared with those from the on-board system for mutual calibration and verification purposes.

Bearing condition—Use a load sensor in the top of instrumented pad 16 to monitor vibrations emitted from the bearing (transmitted through the roller bearing adapter). Specific bearing defects can be inferred from frequency spectrum analysis. Identifying a failing bearing in its early stages is important in preventative maintenance programs.

Wheel condition—A load sensor in the instrumented pad to detect high amplitude loads (compared to the background) that repeat periodically (function of wheel diameter and speed) to identify a flat spot or shelled wheel tread. It may also be possible to identify hollow worn wheels using some of the other sensors in the instrumented pad. Monitoring wheel impacts may allow an owner to schedule a wheel change out before it is identified by a trackside Wheel Impact Load Detector resulting in unscheduled maintenance. It may also provide insight into cause of failure.

Wheel derailment—Using the same instrumentation as for the Wheel Condition, but looking for a higher frequency and a similar signal from both wheels in the wheel set. Identifying when a wheel set has derailed prevents a possible full derailment and possible catastrophic consequences.

Truck Hunting—Using load sensors mounted in the instrumented pad so as to detect longitudinal, lateral and yawing forces, monitor rapidly changing loads (and hence the angle of attack of the wheel set) indicative of axle or truck hunting. By analyzing such loads monitored from both wheel sets on a truck, and both trucks on a car, truck and axle hunting as well as truck warp can be identified. Additionally by assessing the angle of attack of wheel sets on each truck, high rotational friction caused by binding side bearings or dry center bowls can be identified. Identifying these conditions helps to prevent damage to freight car trucks and lading as well as to the track infrastructure.

Car weight—Sum the load measured in all eight instrumented pads on a freight car to determine its weight. Even a coarse measurement (say plus or minus 10% of full load) will provide useful information for those charged with assessing the performance of freight cars and their components. A further benefit comes from detecting load imbalances due to improper loading or shifting in transit.

Displaced roller bearing adapter—By monitoring the load in the instrumented pad legs it is possible to identify when a roller bearing adapter has become displaced. This provides information about what caused the displacement as well as drawing attention to an urgent maintenance need to avoid damage to the roller bearing.

Brake performance and status—Monitoring the longitudinal forces at an instrumented pad provides information on the force being applied from brake pads to wheels. This can provide insight into braking efficiency (excessively high brake loads indicating brakes may cause wheels to bind, excessively low brake loads indicating the brakes are not working properly. In addition, checking brake status can be used to send an alarm if the train is moved with some of the handbrakes applied.

Track defects—Monitoring the vertical loads in the instrumented pads and comparing these between wheel sets gives car owners insight into track defects that may cause damage to freight cars or their lading.

While several alternatives have been identified above for the configuration of the devices and for the communication between them the preferred embodiment is described hereinafter.

It will be apparent to those familiar with the programming of microcontrollers and the protocols and capabilities of both low power and satellite or cell phone communications that the functions described herein are feasible with existing technology and components. For instance, the Micaz low power motes, made by Crossbow Corp., of Palo Alto, Calif., with their built-in ChipCon radios can perform the functions of the Pads and of the data control unit. The communications device 24 is a model DS300-RDT made by Stellar-Sat, Inc. That device has significant computing power so that some of the functions ascribed herein to the data control unit 23 can be performed in the DS300-RDT. Indeed, the two devices may well be combined or their functions shared so that the distinction could become unnecessary.

The power source consists of an energy scavenging device, such as a piezoelectric film from Measurement Specialties, Inc., of Hampton, Va., together with a charge storage capacitor or a rechargeable battery.

The instrumented pads are programmed in manufacture with a group number, a channel number and a unique, extended address which is stored in non-volatile memory and matches the data in the RFID tag and barcode if used. With appropriate programming, the number of available addresses for distinct instrumented pads can be increased as much as necessary.

The group number serves, as is standard with such IEEE802.15.4 systems, to distinguish this application from any others which might use the same radio frequency (channel).

As the pads are installed their extended addresses are read by registrar 23b which is equipped to gather the RFID or barcode data. The user instructs the registrar, by means of its keypad and screen as to which location on the truck and hence on the freight car is occupied by each pad. The registrar is then placed in proximity to the data control unit 23, and using the radio channel, passes the address and location data for the pads on that data control unit's own freight car into the data control unit.

To avoid the use of RFID or barcode means the registrar can alternatively exploit the functionality of the pad and electronics which is programmed always to send out messages whenever it has power available. Those messages, as are explained hereinafter, always contain the extended address of the pad, so that the registrar can gather it when it is close to the pad. This mode of operation has the disadvantage of requiring the pad to be electrically powered for the dialog to take place, which is not convenient if the pad is to be powered in normal operation by energy scavenging means. If extra means are provided to provide electrical energy, for example, by induction, then the use of the radio communication becomes preferable.

The registration of pad data could alternatively be conveyed into the data control unit by other means, such as using the data link 24. In any case, the data is recorded in the data control unit in non-volatile memory so that temporary loss of power does not obligate repeat registration. The process of registration allows tracking of devices throughout the railroad system.

Once the pad identities are written in to the data control unit, subsequent transmissions from instrumented pads will be recognized by the data control unit if they emanate from a registered instrumented pad. Likewise subsequent transmissions from the data control unit can be directed to the correct instrumented pads.

Irrelevant messages that are picked up from nearby instrumented pads and data control units are not a problem if they do not collide in time with the desired messages. They can simply be ignored. If they collide, then messages will be corrupted. However, by using the normal IEEE802.15.4 standards for cyclic redundancy checking of message validity, they will not be recognized and will, therefore, be missed. To minimize this problem, the data control unit manages the timing of messages to and from its own instrumented pads.

Initially, instrumented pads will start sending messages at the rate of one a minute or similar rate, just after they are powered. This message, broadcast as if for any recipient, but with the correct group number and on the appropriate channel carries the pad's address as the sender address. This is the only type of message that is sent as a broadcast in this scheme. The pad then waits briefly for a reply. The data control unit, when powered, acts as a receiver so it picks up the message. Because it can recognize the sender address as belonging to one of the pads for which it is responsible, it replies immediately with a message that instructs the pad as to which data gathering task to perform and when (how much later) to report back. The pad is programmed so that any message it receives which uses its own full address is accepted as having come directly or indirectly from its controlling data control unit and automatically sends replies back to that sender. As a result, the pads will need no further addressing instruction for the rest of their useful lives, since they will automatically take instruction from and report back to whichever device addresses them directly and are near enough. Having received a message from the data control unit, the pad can revert to low power (sleep mode) until it has to perform its next task.

This scheme allows pads to stop functioning due to loss of scavenged power and still come back and be connected into their appropriate data control unit when power is restored.

The scheme allows a data control unit to be replaced in the network by giving it the addresses of the pads for which it is responsible. A single pad can be replaced in the network by giving its ID to the appropriate data control unit.

The scheme also allows other devices to be operated in the network, as long as they have an associated, proximate data control unit.

By the time that all the instrumented pads belonging to a data control unit have had a round of communication, they are on a schedule that brings them up in turn at times which the data control unit can anticipate. The instrumented pads are essentially incommunicado in the intervening period to save power.

The scheme for scheduling messages in the system deliberately keeps messages from the instrumented pads on a single freight car separate in time, so radio signal collisions are avoided. Because the instrumented pads themselves are only acting as receivers very briefly, the risk of them receiving spurious messages is also small. Because the scheduled radio transmissions from the instrumented pads are very short, e.g., a few milliseconds, compared to the intervening quiet period, the chances of radio signal collisions from adjacent freight cars or other completely independent devices are also low. However, they will eventually occur. The standard approach for the IEEE scheme is that a radio about to send out a signal first goes into receiver mode to see if any other is transmitting on the channel. If so, it delays sending by a random amount of time related to message length. This procedure eliminates most collisions.

If an expected, scheduled message from an instrumented pad does not arrive within a reasonable time frame, then the data control unit can take a number of different actions. It can sometimes detect that a message was received but was corrupted. Knowing that the sending instrumented pad will be expecting a reply for a while, it can send a message instructing a slight random shift in timing so that if the problem comes from an adjacent freight car, then the next message will very likely get through.

Correspondingly, the instrumented pad can repeat its message, out of schedule, if it does not get a reply so that the data control unit, always powered and normally acting as a receiver, will soon pick up the connection and can, as in the initial start-up process, assign a new schedule time for transmission. The data control unit can wait another cycle to see if it was a chance event, it can quiet its other instrumented pads for a while when they call in, so that they do not interfere with transmissions from the missing device. By these and other similar stratagems, the instrumented pads and data can take steps to restore communications. Eventually, if all these fail, the data control unit will report loss of communication via the messaging link 23*a*.

It is a feature of this invention that the pads never stop trying to make contact with a data control unit so long as they have sufficient power and no external message to a Pad is capable of stopping that process although a long, but not indeterminate, delay before the next report is naturally allowed.

With communications established, the data control unit instructs the pads as to which data acquisition task to carry out and when to report back so as to provide information to enable the inferences indicated above to be performed. Such tasks include but are not limited to: measure temperatures, take average forces, deliver spectral data on lateral or vertical or longitudinal forces, measure vertical forces over cycles at wheel rotation frequency. Each of these measurement sequences corresponds to a particular inference that may be drawn if the data justifies it.

For each task a time to wait before reporting back is assigned. For each task a time at which the measurement should be taken is assigned or periodicity is assigned.

The tasks may require the pads to make intermediate measurements and store them temporarily between radio reporting intervals. These intermediate, timed actions can be undertaken without intervention of the data control unit. Between such activities, the pads revert to low power sleep mode, provided there is sufficient time to restart, the process results in energy economy.

Every report sent back by a pad identifies the task that was requested and the elapsed time since the data in the set was gathered.

Every report includes status information (status byte) on the functionality of the pad components especially the sensors.

The set of requests includes the option to request reporting received signal strength as a check on communications.

The data control unit schedules the reporting times so that the radio transmissions do not conflict with each other.

The data control unit can parameterize the data requests with relevant information such as ambient temperature or vehicle speed. The commands, which select the measurement task, can be made location dependent by using the GPS information. The commands can be influenced by the measured accelerations at the data control unit when such facility exists.

The data control unit has a default program of measurements to run through, using its pads as data gatherers so that regular assessments of freight car behavior are made in a timely manner. However, this regular pattern can be superseded by commands sent to the data control unit from the central data repository or by command of the owners or operators.

The data control unit in its role as information aggregator merges the data from the pads and makes adjustments as necessary for the slightly different times at which the data was reported and gathered. The data control unit then performs the assessments described above for the inference engine to check if the freight car, its trucks or wheels or axles are behaving sufficiently poorly that a report to the central data handling location or owner or operator or locomotive is needed. If so, then the report can be sent. It is important to minimize the data being sent because the data transmission may be priced by quantity, and there can be many rail cars sending data. Nevertheless, the data control unit will schedule the sending of an "all's well" message at suitable intervals should nothing be amiss.

The rules for assessing freight car performance are designed to be tolerant of missing data, since it will be apparent from the above description of the system that either due to communications difficulties or to the rigors of the environment, components may fail to provide all the requested data.

Because this preferred embodiment delegates the initiation of data dialog to the pads, a further advantage is that should some extreme condition occur the pad can send an unsolicited report at any time between scheduled reporting intervals. To minimize data traffic, the same approach is taken in the sending of data from the data control unit to the central data base.

For a version of the invention that can take advantage of the choice of several (e.g., 26 in the 2.4 GHz band) available operating frequencies, the following additional features are added. The central data control can extract from GPS data sent by the cars, which pairs of cars are actually adjacent. If the cars are reporting communications problems, then one of such a pair can be told by communication, from the center to the car, to switch to another channel. Networks of IEEE802.15.4 devices can be programmed to do frequency hopping by mutual agreement to avoid interference. In the event that communications are lost, such devices will broadcast messages on a sequence of difference frequencies until a response provides the basis for reestablishing communications. Limiting the choice and predefining the sequence of frequencies to be tried expedites the recovery process. The system can also be programmed to provide deliberate changes of frequency by sending the instructions therefor as part of the regular dialog between pads and data control unit.

Thus, by the means described, the objectives of the invention are carried out.

What is claimed is:

1. A monitoring system for monitoring performance criteria of a railcar, said railcar including a car body and a plurality of trucks each carrying one or more wheel sets mounted on said railcar, comprising:
   one or more pads disposed between each wheel set and its corresponding truck;
   one or more sensors disposed on said pads, said sensors measuring parameters relevant to the operating performance of the railcar;
   a computational element disposed on said pads programmed to control the periodicity and sampling frequency of readings from said one or more sensors and for performing an analysis of data gathered via said readings;
   a communication element disposed on said pads for transmitting data selected as a result of said analysis; and
   a data control unit, mounted on said railcar, for uniquely addressing each pad, for receiving data transmitted from said one or more pads, for analyzing said data, and for selectively communicating said data to a receiver located at a location remote from said railcar.

2. The monitoring system of claim 1, wherein said receiver is located in a locomotive, in a train of which said railcar is a part.

3. The monitoring system of claim 1, wherein said data control unit programs said computational element on each of said pads to control (i) the sampling frequency for each sensor associated with said pad; (ii) the periodicity of sampling for each sensor associated with said pad; and (iii) how often collected data should be transmitted via said communications element to said data control unit.

4. The monitoring system of claim 1, wherein said data control unit communicates said data to said remotely located receiver wirelessly.

5. The monitoring system of claim 1, wherein said communication element transmits said gathered data wirelessly to said data control unit.

6. The monitoring system claim 1, wherein each of said sensors is responsive to one of a plurality of variables, including changes in compressive stress, shear stress and temperature within said pad.

7. The monitoring system of claim 3, wherein said pad may transmit an unsolicited or unscheduled message if said computational element determines that said gathered data is outside an acceptable range for a particular sensed parameter.

8. The monitoring system of claim 7, wherein said data control unit can draw inferences regarding the status of said railcar based on data gathered from all of said pads.

9. The monitoring system of claim 1, wherein each of said pads is identified to said data control unit by a unique address.

10. The monitoring system of claim 8, wherein said data control unit transmits a message to said remote receiver when it determines that said inferred status indicates a problem in the operation or performance of said railcar.

11. The monitoring system of claim 1, wherein said data control unit periodically transmits a status message to said remotely located receiver when an inferred status indicates that said railcar is operating with acceptable boundaries.

12. A system for monitoring performance of a railcar, wherein the railcar has plural trucks each having wheel sets spaced apart on axles and bearing assemblies individual to each wheel of a wheel set relatively rotatably mounted on the axles in association with each wheel, the trucks having side frames having spaced pedestal pockets within which the bearing assemblies are received, the combination comprising an elastomeric, load bearing pad located between a pedestal pocket and a bearing assembly, said pad allowing for limited relative movement between the bearing assembly and the pedestal pocket and providing damping of shock and abrasion, the pads further permitting controlled yaw movement of the axles within the pedestal pockets, the pads having at least one sensing device supported thereon, said at least one sensing device being a temperature sensor disposed on the pads adjacent a bearing for sensing bearing temperature, and control circuitry including a first communications circuit mounted on each pad for receiving signals indicative of temperature of the bearing unique to that pad and a second communications circuit mounted on a railcar body, said second communications circuit including logic circuitry for periodically addressing each sensing device on the railcar and for communicating values derived by said sensors to a remote location, said values being communicated only upon a determination by the logic circuitry that the values are indicative of a potential operating failure.

13. A system according to claim 12, further including a power supply associated with each said pad.

14. A system according to claim 13, where said power supply is a battery.

15. A system according to claim 13, wherein the power supply is an energy scavenger device.

16. A system according to claim 15, wherein the power supply derives energy from the rotation of the wheels of the railcar.

17. A system according to claim 15, wherein the energy scavenging device is a vibration responsive device, converting vibrational energy of the railcar to electric power.

18. A system according to claim 17, wherein the energy scavenging device is integrally mounted on the pad.

19. A system according to claim 12, wherein the communications circuits comprise low power, wireless receiver/transmitters conforming to the low power radio standard of IEEE802.15.4.

20. A system according to claim 12, further including a solar powered energy source for powering the second communications circuit.

21. A system according to claim 12, wherein the pads have a second sensing device supported thereon, said second sensing device being a vibration sensing device and being positioned on the pad to sense bearing vibration, said first communications circuit receiving signals from said second sensing device representative of vibrations and identifying vibration levels indicative of potential failure and communicating said signals of vibration level indicative of potential failure to said remote location.

22. A monitoring system for monitoring performance of railcars in a train including an operating locomotive wherein each railcar comprises a railcar body and supporting trucks with side frames having pedestal openings, wheel sets including an axle and spaced wheels retained by the pedestal openings, the axles carrying wheel bearings retained in said openings and elastomeric pads within each of the openings for attenuation of loads communicated between the bearings and the pedestal jaws, the pads being instrumented with sensing devices for sensing operating parameters selected from the group comprised of vibration, dynamic and static vertical loading, shear forces and temperature, each pad having an associated microprocessor, each microprocessor being programmed to a periodically active state to scan the sensed data for indications of potential failure, each pad further having a transmitter, the system further comprising a data gathering unit mounted on the railcar body including means for receiving signals indicating potential failure and transmitting said signals to a remote location.

23. A monitoring system according to claim 22, further including a receiver located in the locomotive for communication of said signals to crew members located within the locomotive.

24. A monitoring system according to claim 22, wherein the transmission of signals to the locomotive receiver is a wireless transmission.

25. A monitoring system according to claim 24, wherein each data gathering unit broadcasts to the receiver in the locomotive, a signal identifying the railcar from which a signal indicating potential failure is being broadcast.

26. A monitoring system according to claim 24, wherein the means for receiving and transmitting signals to the remote location is inactive in the absence of a signal indicative of potential failure.

27. A monitoring system according to claim 22, further including a power supply for the microprocessors on the pads, wherein said power supply includes a switch, said switch being operable to switch on the power supply upon scanning of the sensors on the pad.

28. A method of monitoring performance of wheeled, interconnected mobile units having bodies supported by wheels, wherein one of said mobile units is a controllable prime mover and the remainder of said mobile units are interconnected to the said one of said mobile units, said method comprising:
providing interfacing pads between the wheels and the bodies of the wheeled mobile units, said pads having embedded sensors for measuring operational parameters of said wheeled mobile units, said pads being programmable to control the sampling frequency for each sensor and the periodicity of sampling for each of said sensors; and
providing, on said pads, a computational capability for evaluating said measured operational parameters, and for identifying performance behavior derived from said measured operational parameters considered to be sufficient to cause alarm; and
communicating to the prime mover messages identifying only the performance behavior sufficient to cause alarm.

29. A method of monitoring according to claim 28, further including the step of including in the messages communicated to the prime mover an identification code unique to the mobile unit from which the signals identifying behavior considered to be sufficient to cause alarm originate.

30. A method of monitoring a load bearing structure comprising the following steps:
disposing a plurality of elastic, compressible pads between relatively rigid elements in the load bearing structure providing the pads with embedded sensors for sensing parameters selected from the group consisting of temperature, displacement, velocity, acceleration, stress, strain pressure, force and combinations thereof, a microprocessor for processing data received from said sensors and a low power transmitter/receiver and an energy scavenging and energy storage device periodically activated to power said microprocessor;
programming the pads with an identifying address unique to each pad, said address including a number to distinguish the pad application from other applications using the same broadcasting frequency;
locating a data control unit on the structure in proximity to the pads, said unit having receiver and transmitting abilities and a data processing unit with storage;
programming the data processing unit with the unique address of each pad;

programming the data processing unit to activate the power source for the pads in timed sequence;

communicating to the pad contacted the task the pad is to perform and a time for reporting back;

processing data signals received from a pad;

merging information derived from other pads in communication with the data control unit;

drawing inferences from the data received from the pads to determine whether alarm conditions exist; and communicating any such alarm condition to a location remote from the data control unit.

31. A monitoring system for monitoring the behavior of a railcar, said railcar including a car body and a plurality of trucks each carrying one or more wheel sets mounted on said railcar, comprising:

one or more pads disposed between each wheel set and its corresponding truck;

one or more sensors disposed on said pads, said sensors measuring parameters relevant to the operating performance of the railcar;

one or more first computational elements disposed on said one or more pads for gathering data from said one or more sensors;

a second computational element, for receiving data from said one or more pads; and a logical inference engine distributed over said one or more first computational elements and said second computational element, said logical inference engine deriving inferences regarding the behavior of said railcar based upon all available data.

32. The monitoring system of claim 31 wherein said logical inference engine uses information available from outside sources in additional to all data collected regarding said railcar in deriving said inferences regarding the behavior of said railcar.

33. The monitoring system of claim 32 wherein said outside sources are selected from a group consisting of a GPS device, an ambient temperature sensor, a speed sensor, an ambient humidity sensor, an accelerometer and a gyroscope.

* * * * *